(12) United States Patent
McNeill

(10) Patent No.: US 6,859,012 B2
(45) Date of Patent: Feb. 22, 2005

(54) BATTERY CHARGING APPARATUS

(75) Inventor: James Thomas McNeill, Indianapolis, IN (US)

(73) Assignee: Thomson Licensing, S.A., Boulogne-Billancourt (FR)

(*) Notice: Subject to any disclaimer, the term of this patent is extended or adjusted under 35 U.S.C. 154(b) by 57 days.

(21) Appl. No.: 10/371,922

(22) Filed: Feb. 21, 2003

(65) Prior Publication Data
US 2004/0164710 A1 Aug. 26, 2004

(51) Int. Cl.⁷ .............................. H02J 7/00; H02J 7/16
(52) U.S. Cl. ................................... 320/133; 320/155
(58) Field of Search .................. 320/133, 155, 320/132, 134–136, 107, 112; 340/636.16, 636; 361/86; 388/811; 396/279; 324/426–431; 379/413; 429/90–93; 455/462

(56) References Cited

U.S. PATENT DOCUMENTS

| | | | | |
|---|---|---|---|---|
| 4,053,717 A | * | 10/1977 | Snider | 455/462 |
| 4,377,787 A | * | 3/1983 | Kikuoka et al. | 324/431 |
| 4,520,353 A | * | 5/1985 | McAuliffe | 340/636.16 |
| 5,115,182 A | * | 5/1992 | Ehmke et al. | 320/136 |
| 5,164,761 A | * | 11/1992 | Isono et al. | 396/279 |
| 5,388,176 A | * | 2/1995 | Dykstra et al. | 388/811 |
| 5,661,796 A | * | 8/1997 | Haraguchi | 379/413 |
| 5,841,284 A | * | 11/1998 | Takahashi | 324/428 |
| 6,051,957 A | * | 4/2000 | Klein | 320/132 |
| 6,054,861 A | * | 4/2000 | Takahashi | 324/428 |
| 6,624,635 B1 | * | 9/2003 | Lui | 324/426 |
| 6,646,845 B1 | * | 11/2003 | Turner et al. | 361/86 |

* cited by examiner

*Primary Examiner*—Pia Tibbits
(74) *Attorney, Agent, or Firm*—Joseph S. Tripoli; Joseph J. Laks; Daniel E. Sragow

(57) ABSTRACT

A load, such as a cordless telephone handset, is powered by a rechargeable battery. The battery is recharged, when the load is not in use, by a battery charger which is controlled by a usage timer which totals the amount of time that the load has drawn power from the battery since the last recharging cycle. The usage timer causes operation of the battery charger to be inhibited until after a predetermined cumulative use.

5 Claims, 2 Drawing Sheets

BATTERY CHARGING APPARATUS

BACKGROUND OF THE INVENTION

In many battery operated appliances, the battery is charged continuously when the appliance is not in use. Such continuous charging gives a shortened battery life as compared to charging the battery only when it is discharged or near discharge.

It is therefore desirable to avoid continuous of a rechargeable battery, so as to extend its life. The instant invention provides a simple solution to this problem.

SUMMARY OF THE INVENTION

A charging apparatus for a battery comprises a rechargeable battery and an intermittent load energized by the battery. A timer is coupled to the load, which timer generates a signal representative of elapsed time of use of the load.

DETAILED DESCRIPTION

Figure 1:
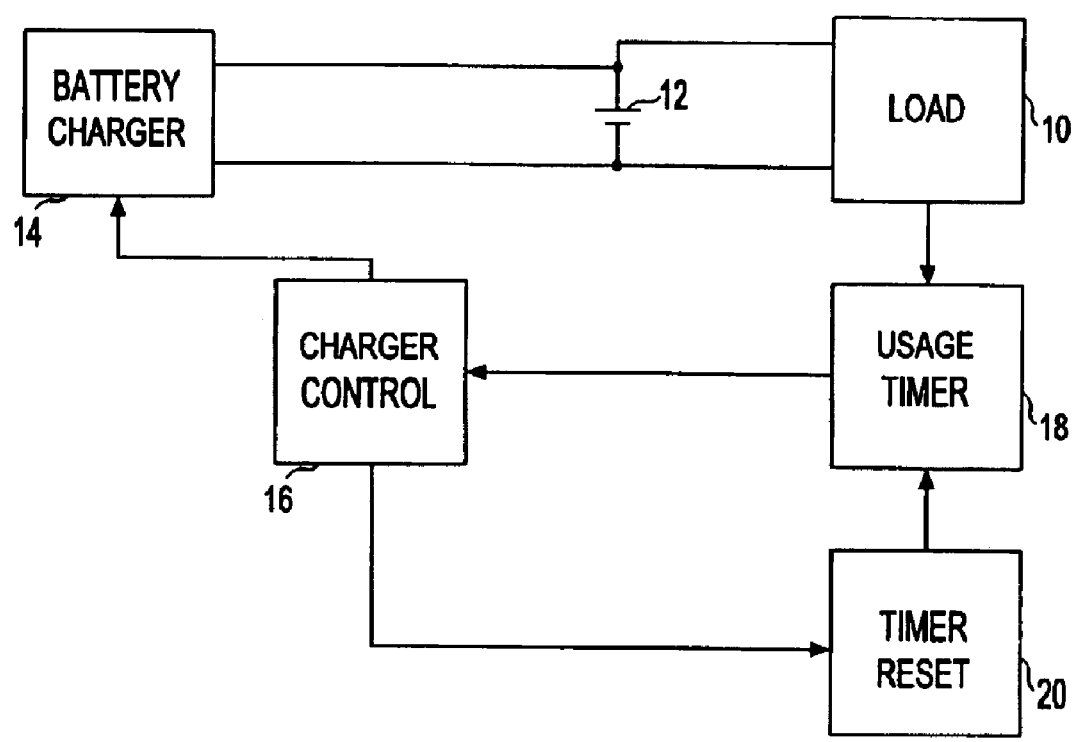
FIG. 1 is a block diagram of a battery charger according to the invention.

An exemplary battery charging apparatus is illustrated in FIG. 1. Load 10, which may be a telephone handset, draws current from battery 12. Battery 12 is recharged by battery charger 14. Battery charger 14 operates under control of charger control 16.

Use of load 10, during which load 10 draws current from battery 12, causes usage timer 18 to advance, so as to store a value indicative of the time during which load 10 has drawn current from battery 12. At a predetermined value of elapsed time during which load 10 draws current from battery 12, usage timer 18 produces a signal which causes charger control 16 to activate battery charger 14. Battery charger 14 operates to fully charge battery 12 and then shut off. Charger control 16 then produces a signal which causes timer reset 20 to reset usage timer 18.

Figure 2:
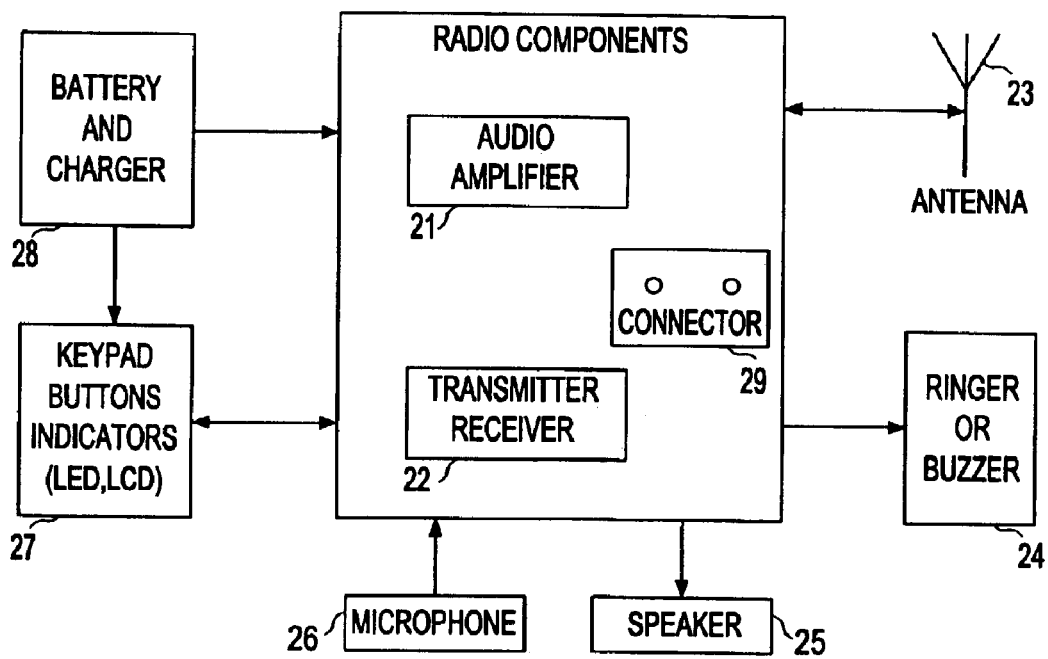
FIG. 2 is a block diagram of a cordless telephone handset unit.

The battery charger apparatus of FIG. 1 is particularly useful in a cordless telephone whose handset contains a battery which is recharged when it is stowed on an associated base unit. FIG. 2 is a block diagram of a typical cordless telephone handset unit.

Figure 3:
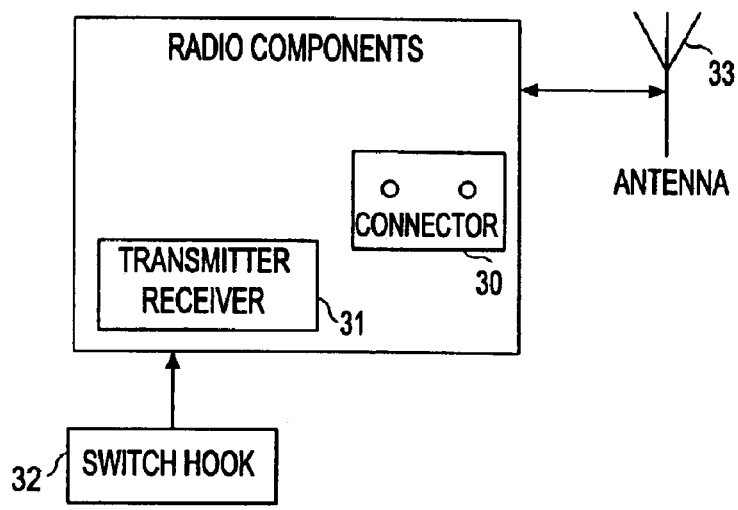
FIG. 3 is a block diagram of a base unit for a cordless telephone.

In FIG. 2, the radio components of the handset unit are shown as audio amplifier 21 and transmitter receiver 22. Transmitter receiver 22 is coupled to antenna 23 for communication with a cooperating base unit, such as shown in FIG. 3. The handset unit contains a battery and charger unit 28, a keypad 27, ringer or buzzer 24, microphone 26, and speaker 25. The handset also contains a connector 29 which couples to a corresponding connector 30 on a cooperating base unit, shown in FIG. 3.

The base unit shown in FIG. 3 contains radio components including transmitter receiver 21, which is coupled to antenna 33. The handset unit of FIG. 2 physically couples to switch hook 32 when the handset is placed in the base unit, while connector 29 couples the handset unit of FIG. 2 to connector 30 of the base unit of FIG. 3, for charging the battery.

If desired, the base unit of FIG. 3 may contain a timer, not shown, which produces a signal indicative of the length of time that the handset unit is separated from the base unit. Such timer may be activated by switch hook 32, which is actuated by the absence of a handset. The value produced by such a timer may be coupled to the handset unit through connectors 29 and 30, as a component of the signal which controls timer 18.

What is claimed is:

1. A battery charging apparatus comprising:
    a) a rechargeable battery;
    b) an intermittent load energized by said battery;
    c) a timer coupled to said load, said timer generating a signal representative of elapsed time of loading of said battery by said load;
    d) means for charging said battery; and
    e) means for controlling said battery charging means in response to the signal generated by said timer.

2. The invention of claim 1 in which said load is a cordless telephone handset, and said timer is located in said handset.

3. The invention of claim 1 in which said load is a cordless telephone handset, and in which said means for charging said battery is located in a base unit associated with said handset.

4. The invention of claim 3, in which said timer generates a signal representative of elapsed time when said handset is remote from said base unit.

5. The invention of claim 1, in which said load is a cordless telephone handset, and in which said means for controlling said battery charging means is located in a base unit associated with said handset.

* * * * *